Figure 1:
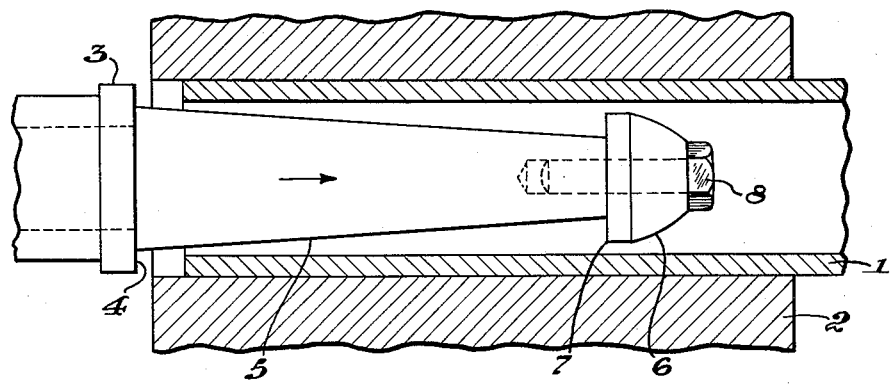

INVENTOR.
GEORGE R. CHAMBERLAIN.

Patented Apr. 10, 1951

2,548,702

UNITED STATES PATENT OFFICE 2,548,702

PIPE UPSETTING AND HOT BROACHING TOOL

George R. Chamberlain, Baden, Pa., assignor to The National Supply Company, Pittsburgh, Pa., a corporation of Pennsylvania Application April 17, 1948, Serial No. 21,661

4 Claims. (Cl. 29—34)

This invention relates to tools for forming upsets at the ends of various types of tubular products, such as drill pipe, well casing and the like, to form integral threaded joints.

Regardless of whether, in the finished product, an upset at the end of a pipe is external or internal, or both external and internal, the end of a pipe is heated to a hot-working temperature, enclosed in a gripping die, and pressure applied to its end by an upsetting tool or punch that is provided with an annular shoulder for engaging the pipe end and with an elongate tapered end which determines the shape or contour of the major portion of the interior of the upset. The end of the punch must be tapered so that after an upsetting operation the punch can be withdrawn from a pipe without breakage or excessive wear on the punch, or scoring of the upset. Consequently, even when in the finished product a pipe has only an exterior upset, a substantial interior upset is formed in the upsetting operation, and to the extent that it is formed the normal bore of the pipe is reduced at the upset.

Because of the varying conditions of temperature, friction and stress that prevail, the shape and extent of an interior upset cannot be positively controlled throughout. The interior contour of an upset is positively controlled by the tapered end of the punch up to the circular line of maximum flow of the metal inwardly from the wall of the pipe, but, due to the varying conditions just stated, the distance of that line from the end of the pipe may vary considerably. To the extent that it does vary, there is a proportional decrease in the bore of the pipe at the upset because of the taper on the end of a punch.

Heretofore, all or portions of interior upsets at the ends of some types of pipe have been removed by a machining operation after the upsets are formed, which is an additional step in the making of the pipe that adds to its cost of manufacture. By machining all of the interior upsets that are necessarily formed when making desired exterior upsets, the inner bores of the pipe are not diminished by the interior upsets, and by removing portions of interior upsets the bores of pipes at the upsets may be made uniform.

The object of this invention is to provide an improved and effective tool for so forming upsets at the ends of pipe that the pipes have desired uniform bores at the upsets, and that the costs of manufacture of upset pipe are reduced.

In the practice of this invention the end of a pipe to be upset is heated to a suitable hot working or forging temperature, which for steel pipe may be from about 2200° to 2400° F., and is enclosed in a gripping die that prevents the pipe from being moved longitudinally during an upsetting operation. If it is desired to form an exterior upset on the pipe, the end of the gripping die is suitably enlarged to control and determine the exterior contour of the upset. The upsetting is then done by moving axially of the pipe an upsetting tool or punch which is provided with an annular shoulder that engages the end of a pipe, and a tapered end that shapes and controls the interior contour of the upset as desired. To the tapered end of the punch there is attached a cutter or broach which, by and upon the removal of the punch from the pipe at the completion of an upsetting operation, cuts an annular portion of the metal from the interior upset to enlarge the minimum interior bore of the pipe at the upset. The annular portion of metal so removed from an interior upset may be cut as a closed annulus, but it is preferably cut in separate sections so that it will fall from the punch when the punch is withdrawn from the pipe. Thus, as a part of the upsetting operation there is cut and removed from the pipe such portion of the metal that forms the interior upset as is desired.

Figure 3:
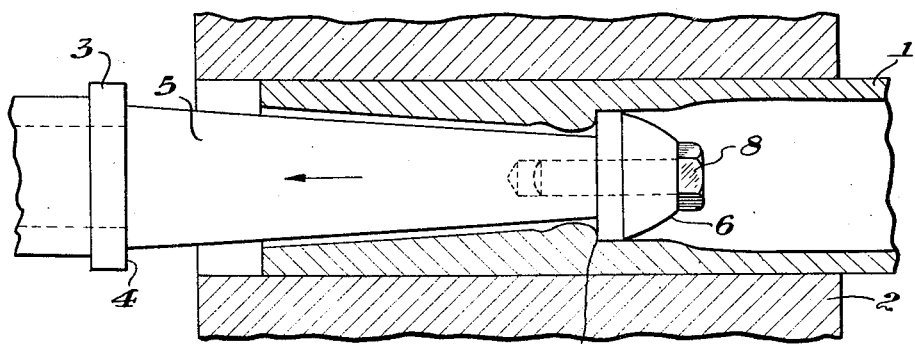
Figure 4:
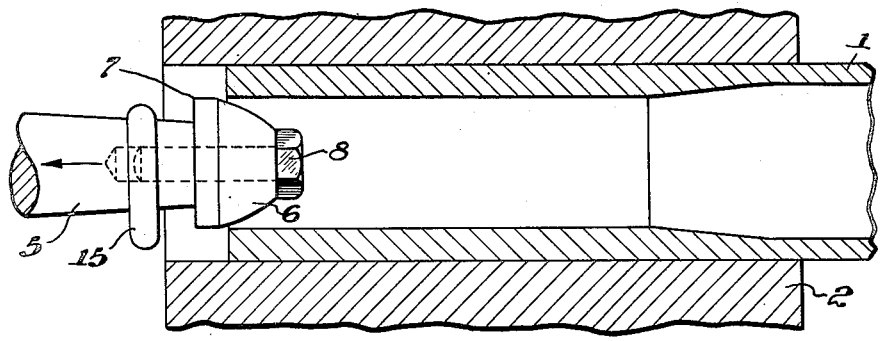
Figure 5:
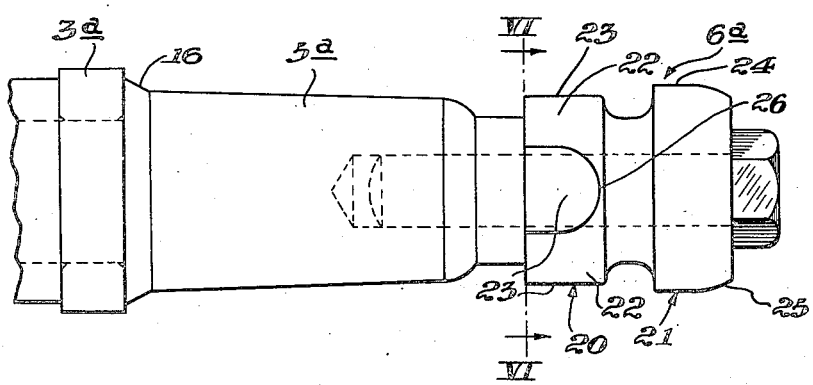

The invention will be further explained with reference to the accompanying drawings, of which Figs. 1, 2, 3 and 4 are somewhat diagrammatic vertical central sectional views of upsetting equipment, including a gripping die and an upsetting punch, showing successive stages of an upsetting and broaching operation by one form of upsetting and broaching tool here provided; Fig. 5 a side view of a modified form of upsetting punch and broaching tool attached to it; and Fig. 6 an end view of the modified broaching tool, the plane of view being taken on the line VI—VI, Fig. 5.

In Fig. 1 the end of a pipe 1 which has been heated to a forging temperature is shown within a portable die 2 which so grips the pipe that it does not move bodily when pressure is applied to its end to upset it. As here shown, the interior of the die is of uniform diameter throughout for forming only interior upsets. To form exterior upsets, the interior of the die is suitably recessed and contoured. Within the pipe, in a position just prior to the beginning of an upsetting operation, there is an upsetting punch comprising a collar 3 that forms an annular shoulder 4 that engages the end of the pipe, and extending beyond ring 3 the punch has a tapered section 5 that shapes the interior wall of the upset as the punch is moved inwardly of the pipe. For clearness, the taper of section 5 is somewhat exaggerated, it usually being less than shown. Upsetting punches such as this are rigidly attached at their outer ends to a crosshead that maintains the punch in axial alignment with the pipe, and is reciprocated by a crank or pressure fluid drive.

At the end of section 5 there is a broach 6 which is provided with a continuous circular cutting edge 7 for removing an annular portion of an upset as a closed annulus, the broach being shown as attached to the punch by a bolt 8. The diameter of the cutting edge 7 is so related to the interior diameter of the pipe that a desired thickness of interior upset remains in the pipe at the completion of the broaching operation.

Figure 2:
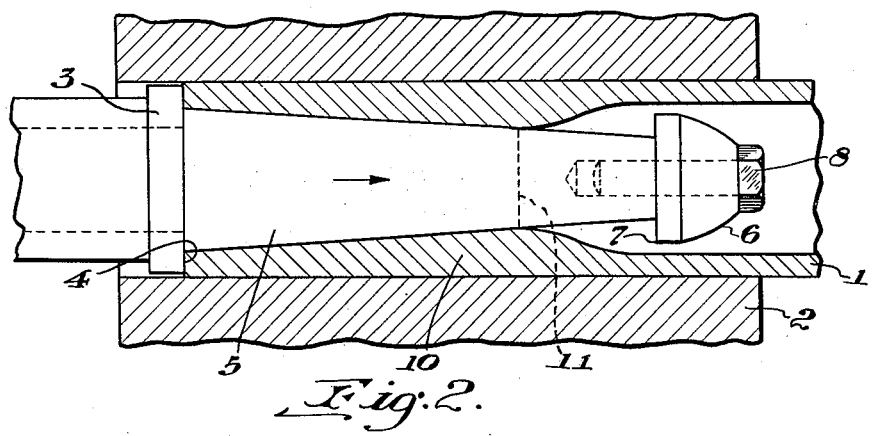

In Fig. 2 the upsetting punch is shown at the completion of its inward stroke during which it has formed an interior upset 10 in the pipe. It will be noted that the tapered section 5 of the punch positively controls the contour of the upset up to the circular line 11 of maximum flow of the heated metal inwardly from the wall of the pipe, such line being at the maximum thickness of the upset. Due to the varying temperature and other conditions that prevail, the distance of line 11 from the end of the pipe may vary considerably. The contour of the upset to the right of line 11 is entirely uncontrolled.

By and upon the outward movement of the punch an annular portion of the upset is cut in the manner generally illustrated in Fig. 3, which shows the punch partly removed from the pipe. When the cutting edge 7 of broach 6 has been moved beyond the end of the pipe, as shown in Fig. 4, the annular portion of metal cut from the interior of the upset is a closed annulus 15 surrounding the tapered section 5 of the punch, and may be removed by cutting it. Instead of being tapered, the upset is cylindrical throughout the portion of it that is cut by the broach, and it is of a desired diameter determined by the diameter of the cutting edge of the broach.

The modified form of punch shown in Fig. 5 is generally the same as that shown in Figs. 1-4, it being provided with a shoulder-forming ring 3a and a tapered section 5a. Adjacent to the ring the tapered section is provided with a secondary steeper taper portion 16 which forms an interior chamfer or bevel at the end of the pipe. When the broach is of such diameter that upon the outward stroke of the punch the broach cuts the upset to the extreme end of the pipe, the metal thus cut may so adhere to the pipe that a lip or scollop configuration is formed on its end, which makes it necessary to perform an additional machining operation. This is avoided by the interior bevel formed at the end of the pipe by the increased taper portion 16 at the end of the tapered section 5a of the punch.

The broach 6a attached to the end of the tapered section 5a (Fig. 5) is provided with successively arranged cutters that are formed to remove an annular portion of an interior upset in discrete parts which fall from the punch when it is withdrawn from a pipe, thus avoiding the necessity of cutting a closed annulus such as shown at 15 on Fig. 4. The broach shown in Figs. 5 and 6 has two cutters 20 and 21, the cutter 20 adjacent to the end tapered section 5a having four circular cutting edges 22 that are spaced apart equally on the periphery of the broach, there being a flat face 23 between the adjacent ends of the adjacent cutting edges. Each cutting edge 22 preferably subtends an arc of a little more than forty-five degrees. The second cutter 21 is provided with a continuous circular cutting edge 24 which shears from an interior upset the parts of an annular portion of it that are not cut by reason of the flat faces 23 on cutter 20, and which removes any irregularities of the surface of the metal resulting from the cutting effected by the spaced cutting edges 22 of cutter 20.

Figure 6:
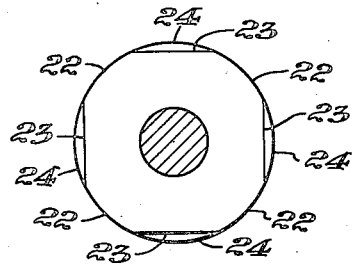

As shown particularly in Fig. 6, the cutting edges 22 of cutter 20 and the continuous cutting edge 24 of cutter 21 lies in a cylinder that is concentric with the longitudinal axis of the punch. The end of cutter 21 is rounded as shown at 25, as is also the corresponding end of cutter 20, the rounding of the latter appearing from the curved line 26 at the right of the flat face shown in full in Fig. 5. As has been explained, the construction of cutters 20 and 21 is such that upsets are sheared in discrete parts which readily fall from the punch when withdrawn from pipe at the conclusion of upsetting operations.

The advantages of the invention are manifest from the foregoing description of it. In commercial practice of it, it has been found that the minimum interior diameters of interior upsets may be made of the uniform size desired, and that this is done expeditiously by and upon the withdrawal of upsetting punches from pipe without the expense of an added machining step in the manufacture of the pipe.

According to the provisions of the patent statutes I have explained the principle and mode of operation of my invention, and have illustrated and described preferred embodiments of it. However, I desire to have it understood that, within the scope of the appended claims, my invention may be practiced otherwise than as specifically described and illustrated.

I claim:

1. A reciprocable tool for upsetting the heated end of a pipe within a die, comprising a punch having a lateral shoulder for engaging the end of a pipe, a tapered end section for shaping the interior wall of an upset formed by moving the punch inwardly of a pipe, and a broach at the end of said tapered section provided with a peripheral cutter of larger diameter than the minimum inner diameter of an upset formed by the punch but of smaller diameter than the inner diameter of the pipe being upset, said cutter being formed to remove an annular portion of the metal of an upset by and upon the removal of the tool from a pipe following its inward movement to form an upset.

2. A reciprocable tool for upsetting the heated end of a pipe within a die, comprising a punch having a lateral shoulder for engaging the end of a pipe, a tapered end section for shaping the interior wall of an upset formed by moving the punch inwardly of a pipe, and a broach at the end of said tapered section provided with successive cutters of larger diameter than the minimum inner diameter of an upset formed by the punch but of smaller diameter than the inner diameter of the pipe being upset, said cutter being formed to remove in discrete parts an annular portion of the metal of an upset by and upon the removal of the tool from a pipe following its inward movement to form an upset.

3. A reciprocable tool for upsetting the heated end of a pipe within a die, comprising a punch having a lateral shoulder for engaging the end of a pipe, a tapered end section for shaping the interior wall of an upset formed by moving the punch inwardly of a pipe, and a broach attached to the end of said tapered section provided with two cutters spaced axially of the tool, the cutter adjacent to the end of said tapered section having annularly spaced circular cutting edges and the other having a continuous circular cutting edge, said cutting edges lying in a cylinder concentric with the longitudinal axis of the punch and being of larger diameter than the minimum inner diameter of an upset formed by the punch but of smaller diameter than the inner diameter of the pipe being upset, and said cutters being effective to in discrete parts remove an annular portion of the metal of an upset by and upon the removal of the tool from a pipe following its inward movement of the tool to form an upset.

4. A reciprocable tool for upsetting the heated end of a pipe within a die, comprising a punch having a lateral shoulder for engaging the end of a pipe, said shoulder having a steeply tapered portion to form a bevel at the end of a pipe and said punch having a slightly tapered section adjoining said shoulder for shaping the interior wall of an upset formed by moving the punch inwardly of a pipe, and a broach at the end of said slightly tapered section provided with a peripheral cutter of larger diameter than the minimum inner diameter of an upset formed by the punch but of smaller diameter than the inner diameter of the pipe being upset, said cutter being formed to remove an annular portion of the metal of an upset by and upon the removal of the tool from a pipe following its inward movement to form an upset.

GEORGE R. CHAMBERLAIN.

REFERENCES CITED

The following references are of record in the file of this patent:

UNITED STATES PATENTS

| Number | Name | Date |
|---|---|---|
| 430,539 | Parmelee | June 17, 1890 |
| 1,452,535 | Sultemeyer | Apr. 24, 1923 |
| 1,758,113 | Kadow | May 13, 1930 |
| 1,837,097 | Barth | Dec. 15, 1931 |
| 1,991,199 | Eisele | Feb. 12, 1935 |
| 2,027,406 | Spatta | Jan. 14, 1936 |
| 2,053,975 | Spatta | Sept. 8, 1936 |
| 2,168,301 | Lemming et al. | Aug. 1, 1939 |
| 2,183,861 | Cotter | Dec. 19, 1939 |